United States Patent [19]

Schwartz, Jr.

[11] Patent Number: 6,147,129
[45] Date of Patent: Nov. 14, 2000

[54] METHOD FOR TREATING POLYESTERS AND, IN PARTICULAR, CLEANING AND DECONTAMINATING POLYESTERS

[75] Inventor: John A. Schwartz, Jr., Spartanburg, S.C.

[73] Assignee: The Coca-Cola Company, Atlanta, Ga.

[21] Appl. No.: 09/164,819

[22] Filed: Oct. 1, 1998

[51] Int. Cl.$^7$ ...................................................... C08J 11/04
[52] U.S. Cl. ............................................................ 521/48.5
[58] Field of Search ............................................ 521/48.5

[56] References Cited

U.S. PATENT DOCUMENTS

| | | |
|---|---|---|
| 3,503,904 | 3/1970 | Dietz et al. . |
| 3,960,817 | 6/1976 | Morawetz et al. . |
| 4,161,578 | 7/1979 | Herron . |
| 4,532,319 | 7/1985 | Wendling . |
| 4,803,256 | 2/1989 | Luckenbach ............................ 525/420 |
| 5,254,666 | 10/1993 | Benzaria . |
| 5,328,982 | 7/1994 | Tindall ..................................... 528/488 |
| 5,532,335 | 7/1996 | Kimball et al. . |
| 5,580,905 | 12/1996 | Schwartz ................................... 521/48 |
| 5,590,479 | 1/1997 | Ruf et al. . |
| 5,597,852 | 1/1997 | Unger et al. . |
| 5,958,987 | 9/1999 | Schwartz, Jr. et al. . |

*Primary Examiner*—Paul R. Michl
*Attorney, Agent, or Firm*—Alston & Bird LLP

[57] ABSTRACT

A method for treating polyesters comprises combining discrete particles of a polyester with an alkaline composition such that the alkaline composition coats the polyester particles. The particles are then heated in an environment that is at least substantially free of water. The method can be effectively used in cleaning, decontaminating and even increasing the intrinsic viscosity of polyester materials. Moreover, when used in the recovery of polyester materials containing contaminants and/or impurities, the method can provide a superior polyester product both in terms of intrinsic viscosity and color.

49 Claims, 1 Drawing Sheet

METHOD FOR TREATING POLYESTERS AND, IN PARTICULAR, CLEANING AND DECONTAMINATING POLYESTERS

FIELD OF THE INVENTION

The invention relates to methods for treating polyesters. In particular, the invention relates to techniques that can be effectively employed in cleaning, decontaminating, and even enhancing the intrinsic viscosity of polyesters. As such, the technique can be useful in a variety of processes including separating materials such as waste materials containing impurities and/or contaminants from polyesters and solid-stating of polyesters.

BACKGROUND OF THE INVENTION

A polyester is a polymeric material which can be made from the esterification of polybasic organic acids with polyhydric acids. Perhaps the most commonly made and used polyester is polyethylene terephthalate (PET), which can be manufactured by reacting terephthalic acid with ethylene glycol.

Polyesters are currently being used in increasing amounts in various applications. For instance, polyesters are commonly used to make all types of containers such as beverage and food containers, photographic films, X-ray films, magnetic recording tapes, electrical insulation, surgical aids such as synthetic arteries, fabrics and other textile products, and other numerous items.

The formation of polyesters such as PET typically involves polymerization at high temperatures and under high vacuum conditions. Polymerization typically involves a two-step process, i.e., polymerization to form PET followed by "solid-stating" of the PET.

Polymerization of monomeric materials to form PET also provides certain side products including DEG and acetaldehydes. The solid-stating of the PET can provide for a reduction of these side products, e.g., acetaldehydes. Solid-stating also increases the molecular weight of the polymer material.

In addition to the challenges of polymerization, another significant issue in the field of polyester technology involves the recovery and recycling polyesters. Because polyesters can be economically remelted and reformed, many efforts are underway to recycle as much polyester as possible after use. Before polyesters can be recycled, however, it is necessary to separate the "post-consumer" polyesters from other products and materials that may be found mixed with or attached to the polyester. Unfortunately, many problems have been encountered in attempting to separate polyester from other waste materials. In particular, many prior art processes are not capable of efficiently or economically recovering polyester when a significant amount of other material, impurities, and contaminants are present.

Many prior art processes for separating polyesters from other materials have focused on "floatation" separation techniques and mechanical recovery processes. In floatation separation, polyesters are separated from other materials based on density differences. For instance, materials containing polyester can be combined with water. The less dense materials that float in water can thus be easily separated from the submerged polyester. This procedure is relatively simple and can be effective in separating polyesters from many low density impurities. Floatation separation techniques, however, cannot be used if the polyester is found in combination with materials that sink in water or that have densities comparable to that of polyester.

Examples of the latter include polyvinyl chloride (PVC) and aluminum, which are not water buoyant. In fact, PVC has a density that is very similar to the density of PET and is often misidentified as PET. Both aluminum and PVC must be separated from polyester before it can be reused. In particular, if PET and PVC are remelted together, hydrochloric acid gases are produced which destroy the properties of the resulting plastic material.

Besides failing to separate polyesters from heavier-than-water impurities, floatation separation techniques and conventional washing also fail to remove coatings or other contaminants that are commonly adhered to polyester. For example, polyester containers are commonly coated with vapor barrier coatings, saran coatings, and/or inks.

Mechanical recovery processes typically involve washing processes used to strip surface coatings and contaminants off polyester without any substantial reaction occurring between the polyester and the wash solution. For example, U.S. Pat. Nos. 5,286,463 and 5,366,998, both of which are incorporated herein by reference in their entireties, disclose a composition and process for removing adhesives, particularly polyvinylidene halide and polyvinyl halide based resins, from polyester films, such as photographic films. In one embodiment, the polyester films are mixed with a reducing sugar and a base to remove the adhesive polymeric resin from the film. An acid is then added to precipitate the resin that can then be separated from the polyester film.

Recently, the focus of recovering polyester from the waste stream has turned to chemically converting the polyester into usable chemical components. Alkaline materials have been employed in such processes. For instance, in U.S. Pat. No. 5,395,858 and in U.S. Pat. No. 5,580,905, both of which are incorporated herein by reference in their entireties, disclose processes for recycling polyesters in which the polyesters are reduced to their original chemical reactants. The process includes the steps of combining the polyester materials with an alkaline composition to form a mixture. The mixture is heated to a temperature sufficient to convert the polyester to an alkaline salt of a polybasic organic acid and a polypol. During the process, the alkaline composition is added in an amount sufficient to react with all polyester present in the mixture.

The foregoing process provides for the complete chemical conversion/saponification of the polyester material. However, this can add a substantial cost to the overall process since the polyester must ultimately be reformed. Accordingly, a technique that only partially saponifies the polyester has been developed. This process is discussed in copending U.S. application Ser. No. 08/631,710 which is incorporated by reference in its entirety for all purposes.

In this copending application, the partial saponification of the polyester is provided by a process which includes the steps of combining polyester with an alkaline solution to form a mixture. The alkaline composition is preferably added to the materials in a stoichiometric amount sufficient to react with up to about 10% of the polyester. The mixture is then heated to a temperature sufficient to saponify a portion of the polyester but insufficient to melt the polyester. This heating and saponification process allows for the removal of a variety of surface contaminants and absorbed impurities including coatings and dirt adhered to the polyester, and organic and inorganic compounds entrained within the polyester.

Despite the ability of this recovery process to impurities and contaminants from polyester, the art is continuing to look for ways to make the recovery process more cost effective and provide a superior recycled product.

SUMMARY OF THE INVENTION

The present invention is based at least in part on the surprising discovery that treating of polyesters such as PET with alkaline compositions in a reaction environment that is at least substantially free of water can allow for the cleaning, decontaminating and even improving the intrinsic viscosity of polyesters. This discovery is in direct contrast to a long-held belief in the field that polyesters must necessarily be degraded in the presence of caustic materials.

In one aspect, the present invention relates to a method for treating a polyester which comprises combining a polyester with an alkaline composition in an amount effective to coat at least a portion of the polyester. The polyester can then be heated to a temperature not greater than the melting point of the polyester. The foregoing heating step is performed in an environment that is at least substantially free of water.

This technique can be used to improve the properties of polyester products obtained from processes for recovering or recycling polyester-containing materials containing contaminants and/or impurities. In this regard, a recovery method includes mixing the polyester-containing materials with an alkaline composition where the alkaline composition is employed in an amount effective to react with a portion of the polyester and the polyester-containing materials followed by heating of the mixture to a temperature effective to saponify a portion of the polyester but insufficient to melt the polyester. The polyester can then be physically cleaned and decontaminated. A key aspect of this process is that the heating step is performed in an environment which is at least substantially free of water. Depending on, e.g., the time of process, the resulting polyester, may experience an improved i.v. and color. Prior to reuse, the polyester can be treated by techniques recognized in the art, e.g., washing.

In fact, because the technique can be used to enhance the intrinsic viscosity of the polyester, it can also be used in method for forming, e.g., solid stating, polyesters.

These and other aspects of the invention will become apparent from the description and claims that follows.

BRIEF DESCRIPTION OF THE DRAWINGS

The FIGURE illustrates a flow sheet of a recycling process for PET according to the invention.

DETAILED DESCRIPTION OF THE PREFERRED EMBODIMENT

Figure 1:
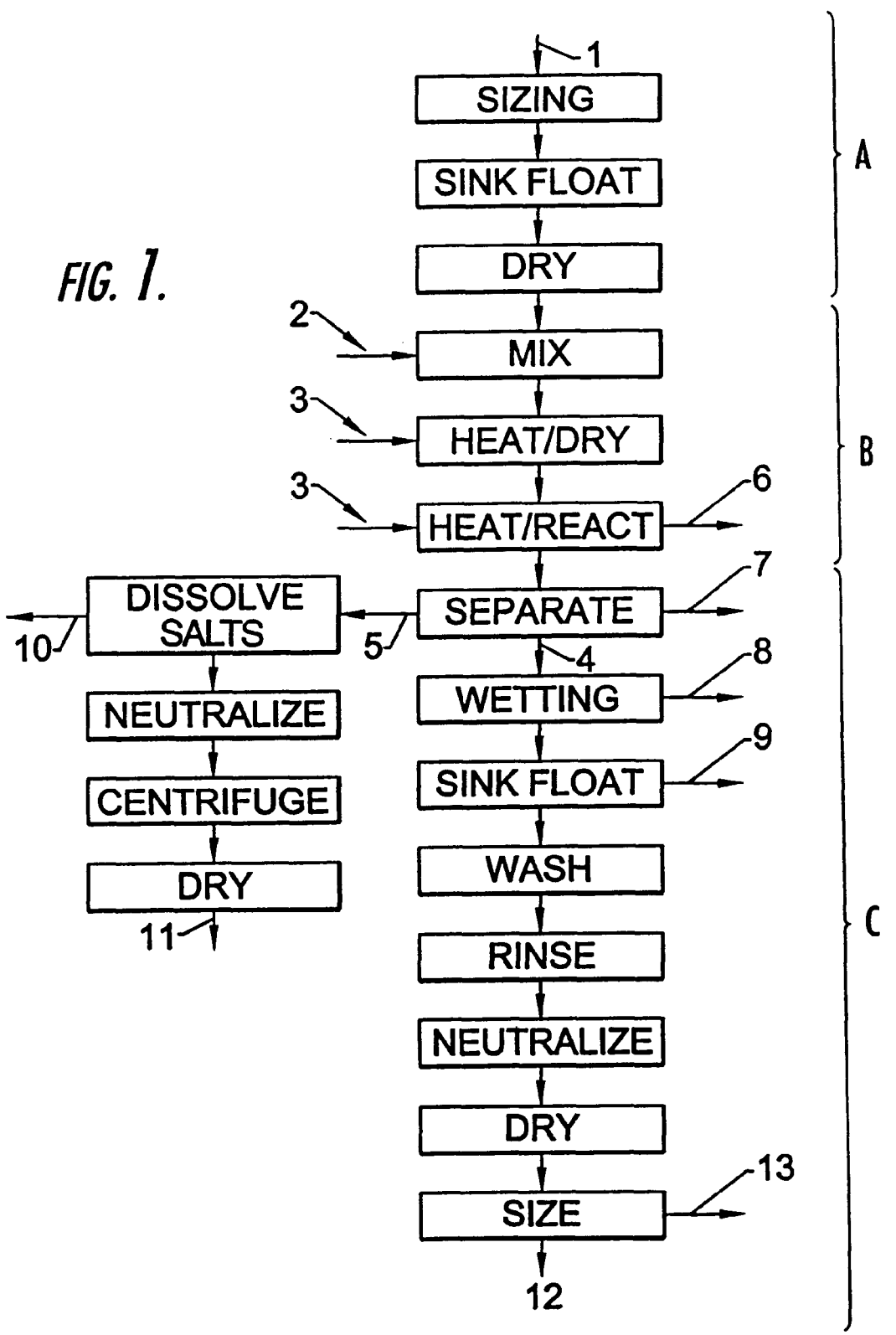

As discussed above, the present invention relates to a technique for treating polyesters that can facilitate cleaning, decontaminating and recycling polyesters such as PET by exposing the polyester to alkaline materials and elevated temperatures. Moreover, the technique can provide an improvement in the intrinsic viscosity of the resulting polyester.

A first aspect of the invention involves treating polyesters by a method which includes mixing a polyester with a caustic material, e.g., an alkaline composition such as sodium hydroxide, followed by heating the material. A key requirement is that the heating environment is at least substantially free of water. Thus, the process can also include removal of any moisture present by, e.g., drying prior to heating the mixture.

By "at least substantially free" it is meant that the amount of water present in the environment is less than that which results in degradation of the polyester during heating. This amount is typically not more than 80 ppm (–40° F. Dew Pt.), preferably not more than about 10 ppm, still more preferably not more than about 5 ppm (–80° F. Dew Pt.). There is no theoretical minimum as the amount of water can be as low as 1 ppm of the environment or even less.

A polyester relates to, e.g., an esterification or reaction product between a polybasic organic acid and a polyol. It is believed that any known polyester or copolyester may be used in the invention. The inventive process is particularly directed to a class of polyesters referred to herein as polyol polyterephthalates, in which terephthalic acid serves as the polybasic organic acid.

As used herein, a polybasic organic acid refers to any organic acid having two or more carboxyl groups (—COOH). Most polyesters are derived from dibasic acids or, in other words, from dicarboxylic acids. Polybasic acids can have a linear or a cyclic conformation. Examples of linear polybasic acids that can be used to make polyesters include the aliphatic dicaroxylic acids, and in particular the aliphatic dicarboxylic acids having up to ten carbon atom in their chains. These acids include adipic acid, glutaric acid, succinic acid, malonic acid oxalic acid, pimelic acid, suberic acid, azelaic acid, sebacic acid, lameic acid, and fumaric acid.

Cyclic polybasic organic acids, on the other hand, include the carbocyclic dicarboxylic acids. The acids are known as phthalic acid, isophthalic acid, terephthalic acid and napthalene dicarboxylic acid and, in particular, terephthalic acid is used to make polyethylene terephthalate that is perhaps the most commercially available polyester.

As described above, a polybasic organic acid is combined with a polyol to produce a polyester. Polyols are compounds that contain at least two hydroxyl groups. Many polyesters are synthesized using a polyol which contains two hydroxyl groups, which are referred to as diols. Diols are normally prepared from an alkene by the net addition of two hydroxy groups to the double carbon bond in a method known as hydroxylation. Polyols are commonly referred to as glycols and polyhydric alcohols. Examples of polyols used to make polyesters include ethylene glycol, propylene glycol, butylene glycol, and cyclohexane dimethanol.

For exemplary purposes, the following table contains a nonexhaustive list of commercially available polyesters according to the invention. For each polyester, the corresponding polybasic organic acid and polyol are provided.

| POLYESTER | POLYBASIC ORGANIC ACID | DIOL |
| --- | --- | --- |
| Polyethylene Terephthalate | Terephthalic Acid | Ethylene Glycol |
| Polybutylene Terephthalate | Terephthalic Acid | Butylene Glycol |
| PETG Copolyester | Terephthalic Acid | Cyclohexanedimethanol and Ethylene Glycol |
| PBTG Copolyester | Terephthalic Acid | Cyclohexanedimethanol and Butylene Glycol |
| Polycyclohexanedimethanol Terephthalate | Terephthalic Acid | Cyclohexanedimethanol |
| PEN Polyester | Napthalene Dicarboxylic Acid | Ethylene Glycol |

The polyester is typically in a discrete form, e.g., finely divided or pelletized. Examples of suitable particles includes pellets having a size of 1–15 mm and flakes having a size of 0.125–0.75 in. However, the precise form is not critical to the present invention in so far as the polyester is capable of being coated by the caustic material.

The caustic material employed in the invention can be any caustic material recognized in the art. Specific examples of caustic materials include alkaline compositions such as sodium hydroxide, calcium hydroxide, magnesium hydroxide, potassium hydroxide, lithium hydroxide, and mixtures thereof.

The amount of caustic material employed is that amount needed to coat at least a portion of the polyester. Preferably, the caustic is introduced in an amount sufficient to coat all of the polyester. The precise amount of caustic material depends upon the level of impurities present and the cleaning required to effectively remove a particular amount of impurities.

As discussed above, where moisture is introduced into the material with, e.g., the caustic, the material can be dried prior to heating. The drying is preferably performed at a temperature not greater than 160° C., more preferably 130–160° C.

The environment in which the heating step is performed is not critical so long as it is at least substantially free of water. Due to cost considerations, a dry air environment is preferred, however, an inert atmosphere such as nitrogen, argon or the like can also be effectively employed.

Finally, the temperature to which material is heated depends upon the nature of the overall process. That is, the treatment can be performed at temperatures up to nearly the melting point of the polyester. The preferred temperature is 200–245° C.

The treatment method of this invention is capable of providing a number of significant advantages. For example, it is capable of cleaning and/or decontaminating polyester. In fact, the polyester can be cleaned and/or decontaminated to a level which is sufficient to meet various regulatory, e.g., FDA, guidelines. Of course, it should be recognized that the desired level of cleaning or decontamination is dependent upon the ultimate end use of the polyester. The technique can also be used to increase the intrinsic viscosity of the polyester. To this end, the heating step in the presence of a dry atmosphere is performed for a period of time sufficient to enhance the intrinsic viscosity of the polyester. A minimum time is dependent on, e.g., the water content of the environment and can be as low as 5–10 minutes. Typical processing is at least about 1 hour, preferably at least about 2 hours.

In light of the foregoing advantages, the inventive technique can be employed in a number of environments including both forming, e.g., solid-stating, and recycling polyesters.

One particular environment in which the inventive treatment can provide significant advantages involves to the recovery of polyester materials. The precise recovery method is not critical as long as it includes both the use of an alkaline material and an environment that is at least substantially free of water.

A specific example of a recovery process according to the invention relates to an improvement of that process discussed in copending U.S. application Ser. No. 08/631,710 which is incorporated by reference in its entirety.

The recovery process of the present invention involves two steps, the first of which is introducing an amount of alkaline material which is sufficient to react at least a portion, but only a portion, of the polyester. In particular, the alkaline material is preferably added in an amount sufficient to react with up to 20% of the polyester, preferably up to about 10% of the polyester and still more preferably up to about 3% of the polyester by weight.

Moreover, as a minimum amount, it is preferred, but not required, that at least about 0.25% of the polyester is reacted, with a minimum of 0.5% or even 1% being acceptable depending on the nature/quantity of contaminants.

The second step involves heating the mixture to a temperature sufficient to saponify a portion of the polyester but insufficient to melt the polyester. This heating can include more than one heating step. A preferred heating sequence in this regard includes heating to a temperature of 150–160° C. so as to dry the polyester, followed by heating, after drying, to a temperature of 200–240° C. in an environment that is at least substantially free of water, preferably a dry air environment.

The recovery process can include pre-treatment steps prior to addition of the caustic as well as additional post-treatment steps to separate and to enhance removal of impurities and/or contaminants from the polyester product.

In most applications, the polyester being recovered is polyethylene terephthalate. A portion of the polyethylene terephthalate will be saponified and converted into a metal terephthalate and ethylene glycol. The metal terephthalate that is produced can be dissolved in water and the water can be acidified, causing terephthalic acid to precipitate. The terephthalic acid can be filtered and reused as desired.

A recovery process according to the invention will now be described in terms of one preferred example thereof which is set forth in the drawing FIGURE. As illustrated in the FIGURE, the recycle process typically involves three phases, i.e., pre-treatment of the polyester, which is generally indicated as A, reaction of the PET which is generally indicated as B, and separation and post-treatment of the reaction products which is indicated as C.

The first of these phases involves pre-treatment of the PET. In this regard, prior to being contacted with an alkaline composition, the polyester, 1, can be, if desired, chopped or ground into a particular size. Sizing of the flake is done solely for the purpose of facilitating handling.

Also prior to being combined with the alkaline composition, the materials containing the polyester can be immersed in water or some other fluid in order to separate the less dense or lighter materials from the heavier materials include the polyester. Such techniques are well recognized in the art. More particularly, it is known that polyester sinks in water while other polymers, such as polyolefins, and paper products are water buoyant. Thus, the lighter materials can be easily separated from the heavier materials when contacted with a fluid. Subjecting the materials to a sink/float separation step prior to contacting the materials with the alkaline composition not only reduces the quantity of materials being processed but also removes the materials from the polyester prior to further processing.

Where subjected to a step including water, e.g., a sink/float separate step, the polyester can be dried prior to being combined with the alkaline material. This drying which occurs at temperatures not greater than 160° C., preferably 130–160° C., can be performed by any art-recognized method.

The next phase of the process, B, involves mixing of the polyester with the caustic material and subsequent drying and heating steps, includes heating in a dry air environment. This aspect of the method preferably involves mixing of the dried polyester material with a caustic material, 2, followed by heating/drying and then introduction of the mixture into a reaction chamber. A hot dry air stream, 3, can also be introduced during the heating steps in order to provide the proper water free environment. During the heating/reaction step, a volatile component-containing stream 6 can be removed from the reaction chamber.

The actual temperature to which the mixture is heated depends upon a number of factors including the particular impurities and/or contaminants present in the mixture. In general, however, the mixture should be heated to as high as possible without melting the polyester. For instance, PET has a melting point typically between 480° F. to about 520° F. In most applications, the temperature can be within a range of from about 212° F. to about 520° F.

The equipment and apparatus used during the process of the present invention can also vary. Thus far, good results have been obtained when the polyester is heated in a rotary kiln. The rotary kiln can be indirectly heated with hot gases, by an electrical element, by heated oil or by fossil fuel burners. One example of a suitable indirectly heated kiln for use in the process of the present invention is the Rotary Calciner marketed by the Renneburg Division of Heyl & Patterson, Inc. It is believed, however, that a multidisc thermal processor, dual cone dryer, or an oven will work equally as well. Of course, many other similar devices are available which may be used in the process of the present invention.

The final stage of the process, C, involves the separation of the various reaction products. In this recovery process, the portion of the polyester that is saponified is converted into a polyol and an acid salt. For instance, when saponifying PET with sodium hydroxide, the PET is converted into ethylene glycol and disodium terephthalate. The polyol that is formed during the process either remains as a liquid in the mixture or is evaporated out of the reaction if the mixture is heated above the boiling point of the polyol.

The first step of the separation stage involves separation of the polyester, 4, acid salt, 5, and any fines, 7, respectively. These components are then individually handled.

The formed acid salt or metal salt, such as disodium terephthalate, dissolves in the water when the heated materials are washed. If desired, the metal salt can be later recovered from the wash water. For instance, if the acid salt is a terephthalate, the wash water can first be filtered in order to remove any undissolved impurities and contaminants which are indicated by stream 10. Next, the wash water can be acidified causing terephthalic acid to precipitate. In order to acidify the solution, a mineral acid such as hydrochloric acid, phosphoric acid or sulfuric acid or an organic acid such as acetic acid or carbonic acid can be added to the solution. Once the terephthalic acid precipitates, the terephthalic acid can be filtered, washed and dried, leaving a relatively pure product 11.

The polyester is also treated prior to reuse. A primary step in the separation stage of the recovery process involves washing of the polyester material.

The washing step suitable for use in connection with the resulting PET can include any washing step or apparatus recognized in the art. However, it is preferred that a high shear washing step is employed in order to facilitate the removal of materials such as oligomers, and other organic and inorganic compositions from the surface of the PET. Such high shear washers are commercially available in the art from manufacturers such as Reg-Mac or Sorema.

Moreover, the washing steps further include neutralization of any remaining alkaline material through the addition of a suitable acid such as phosphoric acid.

Other steps in the post-separation treatment of the polyester depend on the particular contaminants and/or impurities in the starting compositions. To this end, the invention can effectively recover polyester from a variety of contaminants and/or impurities.

For example, the method can be used to separate polyesters from polyvinyl chloride. The aspect of the process involves the heating of the mixture of alkaline composition and the polyester materials to a temperature sufficient to dechlorinate at least a portion of the polyvinyl chloride thereby converting the polyvinyl chloride into a form separable from the polyester. The mixture, however, is heated to a temperature insufficient to melt the polyester.

In order to separate the dechlorinated polyvinyl chloride from the polyester, the mixture, after being heated, can be combined with a fluid such as water. When placed in water, the polyester will sink while the dechlorinated polyvinyl chloride will float. Thus, a stream, 9, containing, e.g., the dechlorinated polyvinyl chloride, can be easily separated from the polyester. Optionally, gas bubbles, which will adhere to the dechlorinated polyvinyl chloride, can be passed through the water in order to facilitate separation.

In addition, discolored PVC may be separated by color sorting techniques recognized in the art. Examples of commercially available equipment include those produced by manufacturers such as SRC, Satake and MSS.

The inventive process can also effectively separate polyesters from small particles, i.e., on the order of microns, of aluminum and the like. This aspect includes heating the waste material/alkaline composition mixture to a temperature sufficient for the alkaline composition to react with at least a portion of the metal without melting the polyester. The byproduct of the reaction between alkaline and the aluminum can be removed in subsequent washing steps.

Another aspect of the recovery process involves removing coatings and/or entrained organic and inorganic compounds from polyesters. In this regard, the polyester/caustic mixture is heated to a temperature sufficient to saponify the outer surface of the polyester, thereby removing the coatings from the polyester. The mixture is heated to a temperature insufficient to melt the polyester.

The recovery process of this invention can run continuously or can be set up as a batch system. Practically any polyester material can be processed. Preferably, the polyester materials are recovered from the solid waste stream, thus alleviating many environmental concerns and disposal problems. The present invention is particularly directed to recycling food containers and beverage containers made from PET. Through the process of the present invention, polyesters can be recovered and reused from post consumer waste, even when the polyesters are found mixed with polyvinyl chloride or aluminum, adhered to various coatings, or entrained with various organic and inorganic compounds. Such materials are currently being disposed of in landfills or are being incinerated after a single use due to a lack of an economical process that will recover the polyester.

The recovery process is capable of providing significant advantages over the more traditional processes employed within the art. In particular, the process is capable of providing a recycled PET product having improved properties, e.g. a high degree of cleanliness, good color and possibly even an improved intrinsic viscosity. Moreover, its capable of providing these products at an acceptable yield and at a lower processing cost since, e.g. it does not require "re-polymerization" of the monomers in contrast to typical depolymerization processes.

In addition to recovery, processes for forming polyesters including, e.g., known solid-stating processes, can be improved through the use of the inventive treatment method.

To this end, solid-stating processes are well recognized in the art and as such will not be discussed in detail here.

For sake of completeness, it is noted that solid-stating processes typically involve the treatment of polyesters such as PET in particle form. The preferred particles include pellets having a size of 1–15 mm. However, irrespective of the size of the particles or the solid-stating process used, the inventive method involves coating of the polyester particles with an alkaline material.

Moreover, solid-stating processes, according to the invention include the heating of coated particles for a period of time effective to promote solid-stating of the polyester. To this end, suitable temperatures, e.g., 200–230° C., and time period, on the order of several hours, are well recognized in the art. However, it is noted that, as discussed above, a two-step heating process including heating to remove water, e.g., at a temperature of about 160° C., followed by heating to about 190–240° C., preferably 200–230° C. in an at least substantially water free environment, can be performed.

The invention will now be illustrated by the following example. It should be noted that this example is offered solely to illustrate the invention and not to limit the invention in any way.

EXAMPLE

Three thousand pounds of post consumer PET bottles contaminated with PVC were ground to a nominal flake size of ⅜" and added to a sink float tank to remove paper and polyolefins. The heavy fraction containing ground PET and PVC was blended with 10% by weight of a 50% sodium hydroxide solution and then added to an electrically heated batch rotary kiln having a diameter of 54" and a heated length of 32'. The material was heated to 250° F. while maintaining a 600 cubic ft. per minute sweep of hot dry air through the kiln (−80° F. Dew Pt., and 250° F. temperature).

After three hours the moisture level of the flake was 0.2% at which time the flake and air temperature were increased to 400° F., and held at that temperature for 9 hours.

The material was then cooled and added to a sink float to remove degraded PVC. After sink floating, the heavy fraction was washed for two minutes in a REG MAC high shear washer, followed by a rinse with a phosphoric acid solution having a pH of about 4. After acid rinsing, the material was rinsed with cold water, dried in a spin dryer at 250° F. to a moisture level of less than 1%, and color sorted to remove any remaining discolored PVC.

A summary of the results is shown in the following table:

|  | I.V. | PVC | b* value |
|---|---|---|---|
| INPUT | 0.75 | 2457 ppm | 9 |
| OUTPUT | 0.84 | 544 ppm after sink float<br>12 ppm after color sort | 6 |

While the inventive process has been described in terms of certain preferred embodiments thereof, it is important to recognize that the invention is by no means limited to those embodiments. Instead, as illustrated above, the advantages associated with both product properties, e.g., color and cleanliness, and process conditions, e.g., air verses an inert atmosphere, are independent of the particular polyester formation or recovery process being employed. Accordingly, while the invention has been described in terms of certain preferred embodiments thereof, various substitutions, omissions, modifications, changes and the like may be made without departing from the spirit thereof. It is intended that the scope of the present invention be limited solely by the scope of the following claims including equivalents thereof.

What is claimed is:

1. A method for treating polyester comprising:
   (a) combining polyester with an effective amount of an alkaline composition to coat at least a portion of the polyester, the amount of alkaline composition being sufficient to react with only a portion of the polyester; and
   (b) heating the mixture to a temperature not greater than the melting point of the polyester wherein step (b) is performed in an environment which is at least substantially free of water.

2. The method according to claim 1 wherein the polyester is in particle form.

3. The method according to claim 2 wherein the polyester particles are in pellet form having a size of 1–15 mm.

4. The method according to claim 2 wherein the polyester particles in flake form having a size of about 0.125 to 0.75 in.

5. The method according to claim 2 wherein the alkaline composition is introduced in an amount effective to coat substantially all of the polyester particles.

6. The method according to claim 2 wherein the polyester is polyethylene terephthalate or polyethylene naphthalate.

7. The method according to claim 2 wherein the alkaline composition is selected from a group consisting of sodium hydroxide, calcium hydroxide, magnesium hydroxide, potassium hydroxide, lithium hydroxide, and mixtures thereof.

8. The method according to claim 2 wherein the temperature of step (b) is 200–245° C.

9. The method according to claim 2 further comprising the step of drying the particles between steps (a) and (b).

10. The method according to claim 9 wherein the drying step is performed at a temperature of 130–160° C.

11. The method according to claim 2 wherein the environment of steps (a) and (b) is air.

12. The method according to claim 2 wherein step (b) is performed in an environment which contains not more than 80 ppm of water.

13. The method according to claim 12 wherein the environment of steps (a) and (b) is air.

14. A method for recovering polyesters containing contaminants and/or impurities comprising:
   (a) mixing polyester-containing materials with an alkaline composition, which alkaline composition is employed in an amount effective to react with only a portion of the polyester in the polyester-containing material;
   (b) heating the mixture to a temperature effective to saponify a portion of the polyester but insufficient to melt the polyester; and
   (c) separating at least a portion of the polyester from the remaining materials, wherein step (b) is performed in an environment which is at least substantially free of water.

15. The method according to claim 14 wherein the environment of step (b) contains no more than 80 ppm of water.

16. The method according to claim 14 wherein the atmosphere of step (b) contains no more than 5 ppm water.

17. The method according to claim 14 wherein the amount of alkaline composition added is sufficient to react with up to 20% by weight of a polyester.

18. The method according to claim 14 wherein the alkaline composition is present in an amount effective to react with up to about 10% of the polyester.

19. The method according to claim 14 wherein the alkaline composition is present in an amount effective to react with up to about 3% of the polyester.

20. The method according to claim 14 wherein the alkaline composition is selected from a group consisting of sodium hydroxide, calcium hydroxide, magnesium hydroxide, potassium hydroxide, lithium hydroxide, and mixtures thereof.

21. The method according to claim 14 wherein the alkaline composition comprises sodium hydroxide.

22. The method according to claim 14 further comprising the step of drying the mixture between steps (a) and (b).

23. The method according to claim 22 wherein drying is performed at 130–160° C.

24. The method according to claim 14 wherein temperature of step (b) is between about 200–500° F.

25. The method according to claim 14 wherein the polyester is polyethylene terephthalate.

26. The method according to claim 14 wherein the environment of step (b) comprises air.

27. The method according to claim 14 further comprising, prior to step (a):
  (i) immersing the polyester-containing materials in water;
  (ii) separating any materials floating in said water from the polyester-containing materials submerged in the water, and
  (iii) drying the remaining polyester-containing materials.

28. The method according to claim 27 wherein said drying step comprises spin drying of the polyester-containing materials.

29. The method according to claim 27 wherein said drying step is performed at a temperature not greater than about 160° C.

30. The method according to claim 14 further comprising:
  (d) washing the polyester.

31. The method according to claim 30 wherein step (d) comprises high shear washing of the polyester.

32. The method according to claim 30 further comprises:
  (e) introducing an effective amount of at least one acid into the polyester so as to neutralize any remaining alkaline composition.

33. A method for treating polyester comprising:
  (a) coating a polyester with an effective amount of an alkaline composition to cover at least a portion of the polyester, the amount of alkaline composition being sufficient to react with only a portion of the polyester; and
  (b) heating the mixture to a temperature not greater than the melting point of the polyester for a period of time sufficient to increase the intrinsic viscosity of the polyester, wherein step (b) is performed in an environment which is at least substantially free of water.

34. The method according to claim 33 further comprising the step of drying the mixture between steps (a) and (b).

35. The method according to claim 33 wherein the period of time is greater than about 1 hour.

36. A method for solid-stating polyester particles comprising:
  (a) providing discrete particles comprising at least one polyester;
  (b) coating the polyester particles with an alkaline composition in an amount sufficient to react with only a portion of the polyester; and
  (c) heating the coated particles to an effective solid-stating temperature and for an effective solid-stating period of time, said heating step being performed in an environment that is at least substantially free of water.

37. The method according to claim 36 wherein the environment contains no more than 80 ppm water.

38. The method according to claim 36 further comprising the step of drying the coated particles between steps (b) and (c).

39. The method according to claim 38 wherein the drying step is performed at 130–160° C.

40. The method according to claim 36 wherein the polyester is a polyethylene terephthalate.

41. The method according to claim 36 wherein the alkaline composition is selected from a group consisting of sodium hydroxide, calcium hydroxide, magnesium hydroxide, potassium hydroxide, lithium hydroxide, and mixtures thereof.

42. The method according to claim 36 wherein the temperature of step (c) is 200–245° C.

43. A method for treating polyester, comprising:
  providing a polyester-containing material;
  mixing the polyester-containing material with an alkaline composition;
  introducing the mixture into a reaction chamber;
  heating the mixture to a temperature sufficient to saponify a portion of the polyester; and
  introducing a dry gaseous stream into the reaction chamber during said heating step so that the reaction chamber is at least substantially free of water during said heating step.

44. The method according to claim 43, wherein the dry gaseous stream is a dry air stream.

45. The method according to claim 44, wherein the dry air stream contains not more than 80 ppm water.

46. The method according to claim 43, wherein the alkaline composition is present in an amount sufficient to react with only a portion of the polyester.

47. The method according to claim 43, wherein said mixing step comprises mixing the polyester-containing material with an aqueous solution of the alkaline composition.

48. The method according to claim 47, further comprising drying the mixture after said mixing step.

49. The method according to claim 48, wherein said drying step comprises contacting the mixture with a dry gaseous stream.

* * * * *